(12) United States Patent
Alaniz

(10) Patent No.: US 9,574,705 B2
(45) Date of Patent: Feb. 21, 2017

(54) HOSE REEL MOUNTING KIT

(71) Applicant: Rudolfo Alaniz, Spokane, WA (US)

(72) Inventor: Rudolfo Alaniz, Spokane, WA (US)

( * ) Notice: Subject to any disclaimer, the term of this patent is extended or adjusted under 35 U.S.C. 154(b) by 68 days.

(21) Appl. No.: 14/454,384

(22) Filed: Aug. 7, 2014

(65) Prior Publication Data

US 2016/0039632 A1   Feb. 11, 2016

(51) Int. Cl.
| | |
|---|---|
| *F04B 35/06* | (2006.01) |
| *F16M 13/02* | (2006.01) |
| *F16M 13/00* | (2006.01) |
| *B65H 75/44* | (2006.01) |
| *F04B 41/02* | (2006.01) |
| *B65H 75/42* | (2006.01) |

(52) U.S. Cl.
CPC .............. *F16M 13/02* (2013.01); *B65H 75/42* (2013.01); *B65H 75/446* (2013.01); *B65H 75/4457* (2013.01); *B65H 75/4478* (2013.01); *F04B 35/06* (2013.01); *F04B 41/02* (2013.01); *F16M 13/005* (2013.01); *B65H 2701/33* (2013.01)

(58) Field of Classification Search
CPC .... Y10T 137/6914; F04B 35/06; F04B 41/02; B65H 75/4457; B65H 75/4478
See application file for complete search history.

(56) References Cited

U.S. PATENT DOCUMENTS

| | | | | |
|---|---|---|---|---|
| 2,804,259 A | * | 8/1957 | Ralston | .................... F04B 35/06 137/899.4 |
| 6,082,408 A | * | 7/2000 | Werling | .................. B60R 11/00 137/899.4 |
| 6,209,749 B1 | * | 4/2001 | Guess | .................... F17C 13/084 137/377 |
| 6,532,990 B1 | * | 3/2003 | Wood | ...................... F04B 41/02 137/269 |
| 2005/0073118 A1 | * | 4/2005 | Sharp | ........................ B62B 1/12 280/47.24 |
| 2005/0168058 A1 | * | 8/2005 | Eberling | ................. B60T 17/06 303/1 |
| 2006/0104835 A1 | * | 5/2006 | Etter | ...................... F04B 35/06 417/410.1 |
| 2007/0176038 A1 | * | 8/2007 | Corrigan | ................. B05C 15/00 242/379 |
| 2009/0226333 A1 | * | 9/2009 | Hsiao | ...................... F04B 41/02 417/234 |
| 2010/0269919 A1 | * | 10/2010 | Stopka | .................... F04B 35/06 137/376 |
| 2010/0290929 A1 | * | 11/2010 | Ohi | ......................... F04B 41/02 417/360 |
| 2012/0321488 A1 | * | 12/2012 | Ritterling | ................ F04B 35/06 417/234 |

* cited by examiner

*Primary Examiner* — Kevin Murphy
(74) *Attorney, Agent, or Firm* — Dunlap Bennett & Ludwig PLLC

(57) ABSTRACT

A hose reel can be attached to a compressed air tank of an air compressor to provide pneumatic hose storage directly at the compressor. The hose reel includes a bracket that attaches to the compressed air tank with a strap. The bracket supports a hose reel about which the pneumatic hose can be wrapped. Once installed, the hose reel keeps the pneumatic hose neatly on the reel and ready for use. If the compressor is a portable compressor, since the hose reel attaches to the compressed air tank of the compressor, the hose reel becomes portable, along with the compressor itself.

10 Claims, 3 Drawing Sheets

HOSE REEL MOUNTING KIT

BACKGROUND OF THE INVENTION

The present invention relates to air compressor accessories and, more particularly, to a hose reel mounting kit, including a bracket, hose reel and associated hardware and strap for mounting a hose reel onto an air compressor.

Shops, garages, and other users of compressed air require a pneumatic hose to deliver the compressed air from the compressor to a point of use. Pneumatic hoses are often draped over air compressor handles, stored in a reel attached to a wall or ceiling, or plugged into outlets of a plumbed system. These systems, however, have either a high installation cost due to hard plumbing, stationary hose reels, or messy unorganized hose storage.

With portable air compressor systems, the user is afforded fewer options for pneumatic hose storage, as hard plumbed systems and fixed (wall or ceiling mounted) hose reels are not very helpful with a portable air compressor that may be used at any distance away from the hard plumbed system or the fixed hose reels.

As can be seen, there is a need for a hose reel for pneumatic hose that can be readily available at the air compressor location while affording convenient and ready access to the pneumatic hose.

SUMMARY OF THE INVENTION

In one aspect of the present invention, a hose reel assembly comprises a hose reel supporting a pneumatic hose; a mounting bracket having a flat member with legs extending from opposite sides thereof, the hose reel mounted to the flat member of the mounting bracket; a set of slots disposed opposite each other on the legs of the mounting bracket; and a strap extending through the slots, the strap configured to tighten about a compressed air tank of an air compressor to attach the mounting bracket thereto.

In another aspect of the present invention, an air compressor assembly comprises an air compressor; an air tank receiving compressed air from the air compressor; a hose reel supporting a pneumatic hose; a mounting bracket having a flat member with legs extending from opposite sides thereof, the hose reel mounted to the flat member of the mounting bracket; a set of slots disposed opposite each other on the legs of the mounting bracket; a strap extending through the slots, the strap tightened about the air tank to attach the mounting bracket thereto.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a hose reel that can be attached to a compressed air tank of an air compressor to provide pneumatic hose storage directly at the compressor. The hose reel includes a bracket that attaches to the compressed air tank with a strap. The bracket supports a hose reel about which the pneumatic hose can be wrapped. Once installed, the hose reel keeps the pneumatic hose neatly on the reel and ready for use. If the compressor is a portable compressor, since the hose reel attaches to the compressed air tank of the compressor, the hose reel becomes portable, along with the compressor itself.

Figure 1:
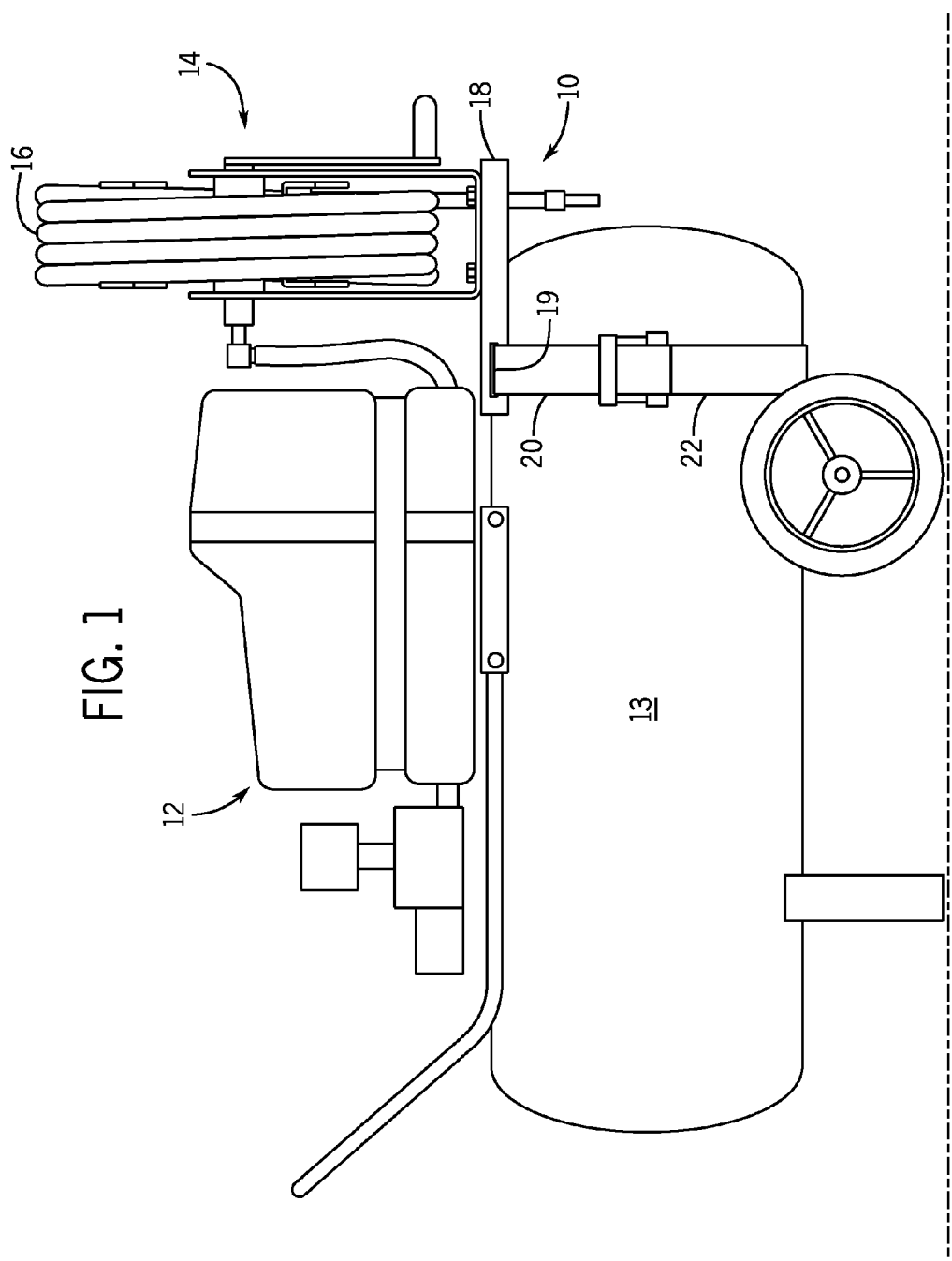
FIG. 1 is a side view of a hose reel mounted to a portable air compressor, according to an exemplary embodiment of the present invention.
Figure 4:
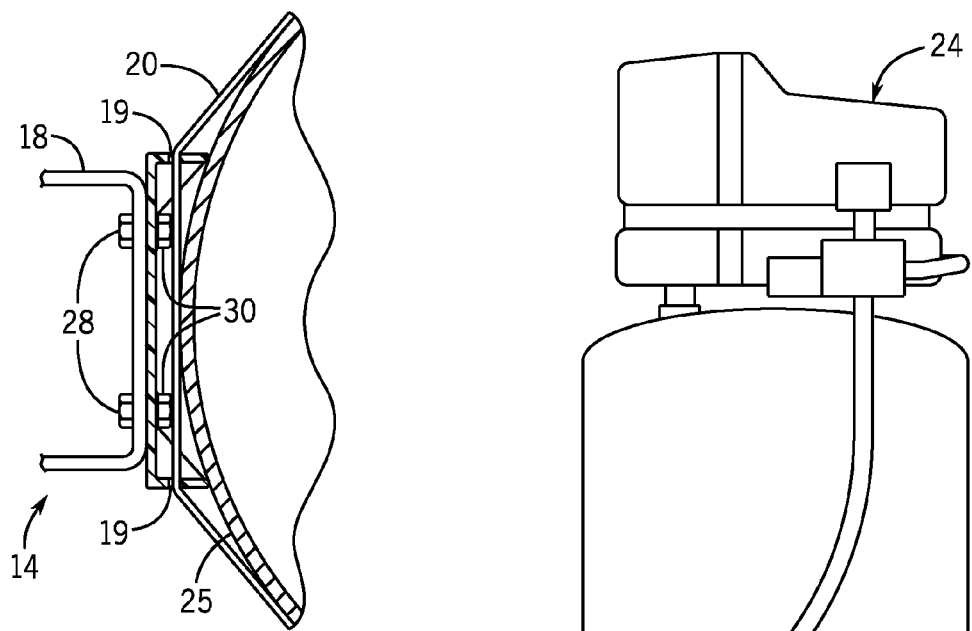
FIG. 4 is a cross-sectional view taken along line 4-4 of FIG. 2.
Figure 2:
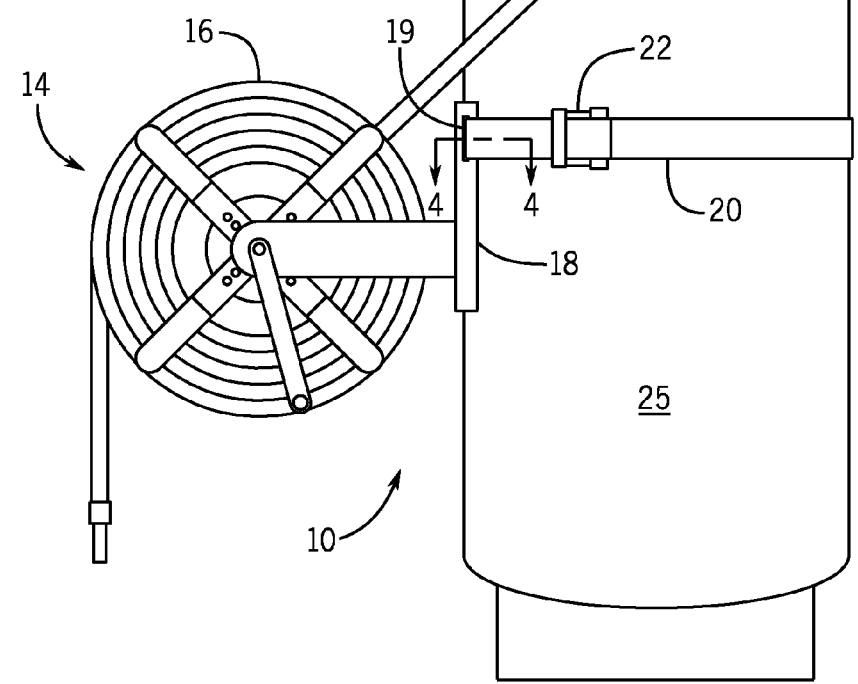
FIG. 2 is a side view of the hose reel of FIG. 1, mounted to a fixed air compressor, according to an exemplary embodiment of the present invention.
Figure 3:
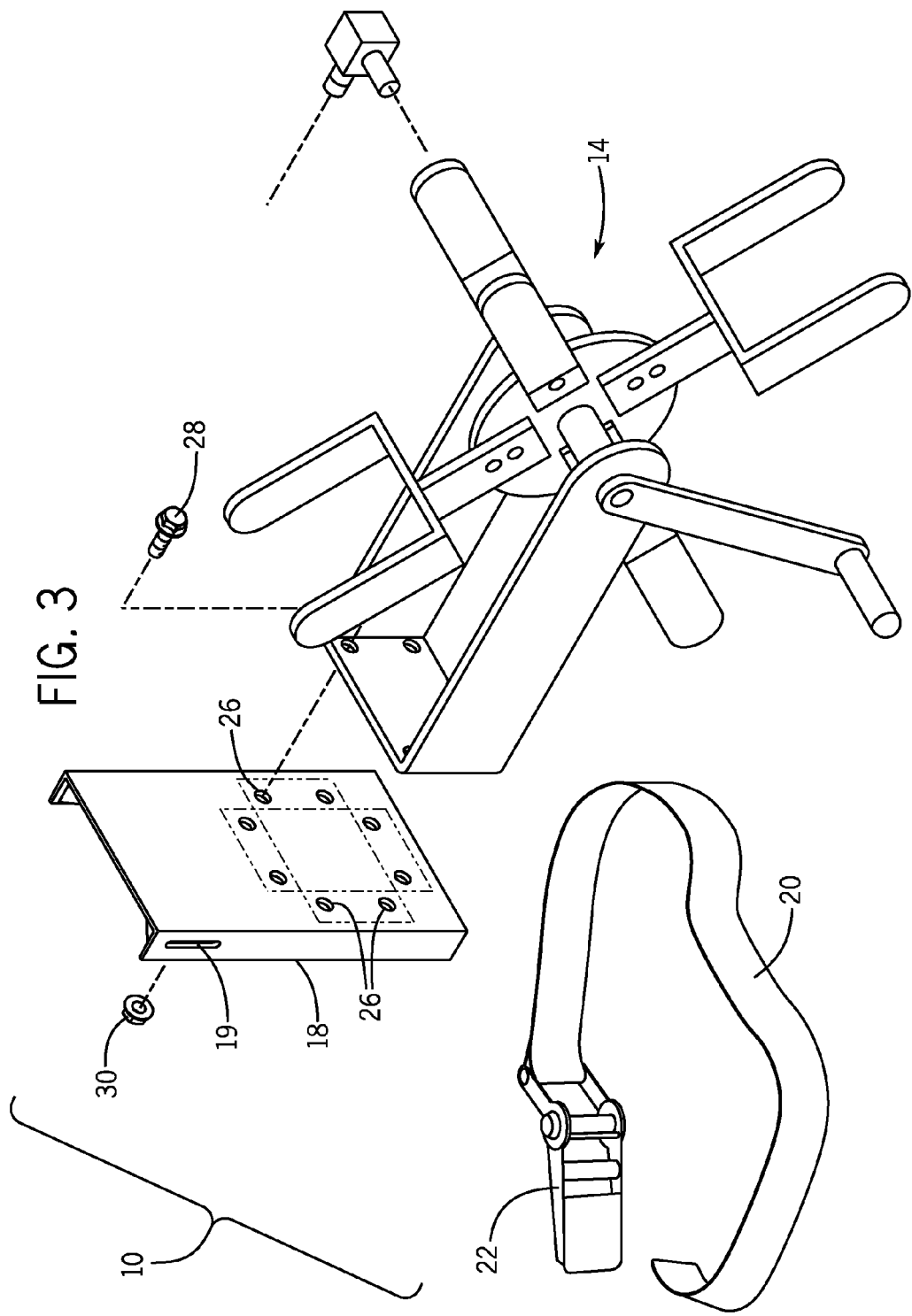
FIG. 3 is an exploded perspective view of the hose reel of FIG. 1.

Referring now to FIGS. 1 through 4, a hose reel kit 10 can include a hose reel 14, a mounting bracket 18, and a strap 20. The hose reel 14 can take various forms as may be known in the art. The hose reel 14 can have an air inlet to connect to a compressor, such as portable compressor 12 or stationary compressor 24, for example. The hose reel 14 can support a length of pneumatic hose 16 thereabout.

The hose reel 14 can attach to the mounting bracket 18 with, for example, bolts 28 and nuts 30 that pass through holes 26 formed in the mounting bracket 18. Of course, other connection mechanisms are contemplated within the scope of the present invention, provided that they effectively attach the mounting bracket 18 with the hose reel 14.

The mounting bracket 18 can be formed in an elongated, flattened U-shape with the hose reel 14 mounting to a bottom part of the U-shaped mounting bracket. Sides of the mounting bracket 18 can include a slot 19 formed therethrough. The length of the legs of the U-shaped mounting bracket 18 can be configured so that, when the mounting bracket 18 is attached to a compressed air tank 13, 25, the legs of the mounting bracket 18 contact the compressed air tank 13, 25. This exemplary configuration is shown in detail in FIG. 4.

A strap 20 is designed to extend through the slot 19 in the mounting bracket 18. The strap 20 can wrap about a compressed air tank 13, 25 and be secured in a buckle 22 disposed at one end of the strap 20. The strap 20 can be tightened about the compressed air tank 13, 25 to secure the mounting bracket 18 (and therefore, the hose reel 14) to the compressed air tank 13, 25. The buckle 22 can take various configurations. In some embodiments, the buckle 22 an be a ratcheting buckle that can ratchet to tighten the strap 20 about the compressed air tank 13, 25.

While a single set of slots 19 are shown in the mounting bracket 18, in some embodiments, the mounting bracket may include more than one set of slots 19, where more than one strap 20 can secure the mounting bracket 18 to the compressed air tank 13, 25.

It should be understood, of course, that the foregoing relates to exemplary embodiments of the invention and that modifications may be made without departing from the spirit and scope of the invention as set forth in the following claims.

What is claimed is:

1. A hose reel assembly comprising:
   a hose reel supporting a pneumatic hose;
   a mounting bracket having a flat member with legs extending generally perpendicular to the flat member from opposite sides thereof, the hose reel mounted to the flat member of the mounting bracket;
   a set of slot openings aligned with each other on the legs of the mounting bracket;

a strap extending through the slots, the strap configured to tighten about a compressed air tank of an air compressor to attach the mounting bracket with an end face of the legs aligned in abutment along a longitudinal length of the compressed air tank.

2. The hose reel assembly of claim 1, further comprising a buckle on one end of the strap for tightening the strap about the air tank.

3. The hose reel assembly of claim 2, wherein the buckle is a ratcheting buckle.

4. The hose reel assembly of claim 1, wherein the flat member of the mounting bracket includes a hose reel mounting area, where the hose reel is mounted thereto, wherein the set of slot openings are formed in the legs, offset from the hose reel mounting area.

5. The hose reel assembly of claim 1, wherein the hose reel is removably attached to the mounting bracket with bolts passing through the hose reel and mounting bracket and nuts attachable to the bolts.

6. An air compressor assembly comprising:
an air compressor;
an air tank receiving compressed air from the air compressor;
a hose reel supporting a pneumatic hose;
a mounting bracket having a flat member with legs extending generally perpendicular to the flat member from opposite sides thereof, the hose reel mounted to the flat member of the mounting bracket;
a set of slot openings aligned with each other on the legs of the mounting bracket;
a strap extending through the slot openings, the strap configured to tighten about the air tank to attach the mounting bracket with an end face of the legs aligned in abutment along a longitudinal length of the air tank.

7. The hose reel assembly of claim 6, further comprising a buckle on one end of the strap for tightening the strap about the air tank.

8. The hose reel assembly of claim 7, wherein the buckle is a ratcheting buckle.

9. The hose reel assembly of claim 6, wherein the flat member of the mounting bracket includes a hose reel mounting area, where the hose reel is mounted thereto, wherein the set of slot openings are formed in the legs, offset from the hose reel mounting area.

10. The hose reel assembly of claim 6, wherein the hose reel is removably attached to the mounting bracket bolts passing through the hose reel and mounting bracket and nuts attachable to the bolts.

* * * * *